(12) United States Patent
Lago, III et al.

(10) Patent No.: US 12,430,436 B2
(45) Date of Patent: Sep. 30, 2025

(54) DETECTING ANOMALOUS LOADING OF DYNAMIC-LINK LIBRARIES

(71) Applicant: Trend Micro Incorporated, Tokyo (JP)

(72) Inventors: Serafin Lago, III, Manila (PH); John David Roan, Manila (PH); Manuel Gatbunton, Bulacan (PH)

(73) Assignee: Trend Micro Incorporated, Tokyo (JP)

( * ) Notice: Subject to any disclaimer, the term of this patent is extended or adjusted under 35 U.S.C. 154(b) by 91 days.

(21) Appl. No.: 18/441,784

(22) Filed: Feb. 14, 2024

(65) Prior Publication Data

US 2025/0258914 A1 Aug. 14, 2025

(51) Int. Cl.
G06F 21/56 (2013.01)
G06F 9/445 (2018.01)

(52) U.S. Cl.
CPC ........ G06F 21/566 (2013.01); G06F 9/44521 (2013.01); G06F 2221/034 (2013.01)

(58) Field of Classification Search
None
See application file for complete search history.

(56) References Cited

U.S. PATENT DOCUMENTS

| | | | | |
|---|---|---|---|---|
| 10,162,967 B1* | 12/2018 | Oliver | ................... | H04L 63/145 |
| 10,289,848 B2* | 5/2019 | Wang | ................... | G06F 21/566 |
| 10,726,128 B2* | 7/2020 | Krasser | ................. | G06N 20/20 |
| 10,778,707 B1* | 9/2020 | Rastogi | ............. | G06F 16/24568 |
| 10,826,934 B2* | 11/2020 | Krasser | ............... | H04L 63/1416 |
| 10,984,104 B2* | 4/2021 | Srinivasagopalan | ... | G06F 18/23 |
| 11,068,595 B1* | 7/2021 | Chiang | ................ | G06F 21/565 |
| 11,151,250 B1* | 10/2021 | Chang | ................... | G06F 21/565 |
| 11,182,481 B1* | 11/2021 | Oliver | .................... | G06N 20/00 |
| 11,232,199 B2* | 1/2022 | Schmugar | ............. | H04L 9/0643 |
| 11,258,805 B2* | 2/2022 | Nguyen | ............... | H04W 12/12 |
| 11,277,423 B2* | 3/2022 | Brown | ............... | H04L 63/1416 |
| 11,501,120 B1* | 11/2022 | Petersen | ................ | G06N 3/045 |
| 11,574,054 B2* | 2/2023 | Abu Alhaol | .......... | G06F 21/568 |
| 11,886,586 B1* | 1/2024 | Chang | ................... | G06F 21/566 |
| 2024/0152622 A1* | 5/2024 | Xia | ........................ | G06F 21/552 |

OTHER PUBLICATIONS

"Difference Between AEGIS (Behavior Monitoring) and Data Loss Prevention SDK in OfficeScan", Trend Micro, Downloaded Jan. 16, 2024, https://success.trendmicro.com/dcx/s/solution/1095461-difference-between-aegis-behavior-monitoring-and-data-loss-prevention-sdk-in-officescan?language=en_US&lan%E2%80%A6=.

(Continued)

Primary Examiner — Backhean Tiv
(74) Attorney, Agent, or Firm — Beyer Law Group LLP (57) ABSTRACT

Anomalous loading of a dynamic-link library (DLL) is detected on a desktop computer. When the file of the DLL is not a known normal file, the locality sensitive (LSH) values of files of known versions of a known normal DLL that corresponds to the DLL are obtained from an LSH repository and compared to the LSH value of the file of the DLL. The smallest distance between the LSH value of the file of the DLL and each of the LSH values from the repository is selected for comparison to a risk threshold. The Loading of the DLL is detected to be an anomaly when the smallest distance is not less than the risk threshold.

16 Claims, 6 Drawing Sheets

(56) References Cited

OTHER PUBLICATIONS

Matt Weiner, "DLL Side-Loading: How to Combat Threat Actor Evasion Techniques", CrowdStrike, Feb. 13, 2023, https://www.crowdstrike.com/blog/dll-side-loading-how-to-combat-threat-actor-evasion-techniques/.

Dynamic-Link Libraries (Dynamic-Link Libraries), Windows App Development, May 31, 2022, https://learn.microsoft.com/en-us/windows/win32/dlls/dynamic-link-libraries.

"Frequently Asked Questions (FAQs) about ScanEngine (VSAPI) 9.0", Trend Micro, Downloaded Jan. 16, 2024, https://success.trendmicro.com/dcx/s/solution/1054882-frequently-asked-questions-faqs-about-scan-engine-vsapi-9-0?language=en_US&sfdcIFrame%E2%80%A6.

Dr. Spark Tsao, "Faster and More Accurate Malware Detection Through Predictive Machine Learning: Correlating Static and Behavioral Features", Trend Micro, Nov. 8, 2019, https://www.trendmicro.com/vinfo/mx/security/news/security-technology/faster-and-more-accurate-malware-detection-through-predictive-machine-learning-correlating-static-and-behavioral-features.

"Network Interface Controller", Wikipedia, Downloaded Jan. 16, 2024, https://en.wikipedia.org/wiki/Network_interface_controller.

Jon Oliver and Jayson Pryde, "Smart Whitelisting Using Locality Sensitive Hashing", Trend Micro, Mar. 30, 2017, https://www.trendmicro.com/en_us/research/17/c/smart-whitelisting-using-locality-sensitive-hashing.html.

"TLSH—A Locality Sensitive Hash", Copyright 2013-2021 TrendMicro, Downloaded Nov. 17, 2024, https://tlsh.org/index.html.

Senan Conrad, "What is DLL Side-Loading?", EMSISOFT Blog, May 8, 2023, https://www.emsisoft.com/en/blog/43943/what-is-dll-side-loading/.

* cited by examiner

DETECTING ANOMALOUS LOADING OF DYNAMIC-LINK LIBRARIES

TECHNICAL FIELD

The present disclosure is directed to cybersecurity.

BACKGROUND

A Windows-based system is a desktop computer that runs the MICROSOFT WINDOWS operating system. Although, there are different versions of the MICROSOFT WINDOWS operating system, these versions share common features to maintain compatibility. The MICROSOFT WINDOWS operating system is currently the most popular desktop operating system in the world and is thus the target of numerous cyberattacks.

A dynamic-link library (DLL) is a module that contains functions or data that can be called by another module, such as an application program or another DLL. A DLL is not directly executed, but is instead loaded by an application program. The MICROSOFT WINDOWS operating system searches for DLLs to be loaded in a particular order, which is exploited by some malware to load a malicious DLL by an attack technique referred to as "DLL side-loading". Examples of malware that perform DLL side-loading include qakbot, icedid, bumbleloader, and blackcat.

Conventional solutions against DLL side-loading are reactive (as opposed to proactive) and/or may not be effective in detecting DLL side-loading. For example, behavior monitoring detects malware based on process sequence or application programming interface (API) invocations. Behavior monitoring is an ineffective or reactive solution against DLL side-loading because the application program that loads the malicious DLL is typically legitimate and executes normally.

Malicious DLLs may be detected by file signature matching. This is a reactive solution in that there are numerous DLL export-dependent application programs, and any one of those DLLs may be modified to perform DLL side-loading.

Machine learning techniques may be employed to detect malicious DLLs based on file features. This solution is applicable to malicious DLLs that are heavily modified versions of legitimate DLLs, but will be ineffective if the modification to the legitimate DLL is minimal.

Malicious DLLs may be detected by locality-sensitive hash comparison, e.g., using the TLSH algorithm. This is a reactive solution because samples of malicious DLLs must first be obtained.

BRIEF SUMMARY

In one embodiment, a method of detecting an anomalous loading of a dynamic-link library (DLL) includes detecting loading of the DLL by an application program on a desktop computer. It is determined if a file of the DLL is a known normal file. When the file of the DLL is not a known normal file, a locality sensitive hash (LSH) value of the file of the DLL is calculated and a plurality of centroids of a known normal DLL having a file with the same filename as the file of the DLL is retrieved, each centroid of the plurality of centroids is representative of a cluster of a plurality of clusters, each of the plurality of clusters comprising LSH values of files of a known version of the known normal DLL. A distance between the LSH value of the file of the DLL and each of the plurality of centroids is calculated. A smallest distance between the LSH value of the file of the DLL and each of the plurality of centroids is selected. The smallest distance is compared to a risk threshold. The loading of the DLL is detected as an anomaly in response to the smallest distance is not less than the risk threshold.

In another embodiment, a system for detecting anomalous loading of a DLL includes a desktop computer and a backend system. The desktop computer is configured to: detect loading of a DLL by an application program on the desktop computer; determine if a file of the DLL is a known normal file; when the file of the DLL is not a known normal file, calculate an LSH value of the file of the DLL and provide the LSH value and a filename of the file of the DLL to a backend system. The backend system is configured to: retrieve a plurality of centroids of a known normal DLL that has a same filename as the file of the DLL, each centroid of the plurality of centroids is representative of a cluster of a plurality of clusters, each of the plurality of clusters comprising LSH values of files of a known version of the known normal DLL; calculate a distance between the LSH value of the file of the DLL and each of the plurality of centroids; select a smallest distance between the LSH value of the file of the DLL and each of the plurality of centroids; compare the smallest distance to a risk threshold; and detect that the loading of the DLL is an anomaly in response to the smallest distance is not less than the risk threshold.

In yet another embodiment, a method of detecting an anomalous loading of a DLL includes detecting loading of the DLL on a desktop computer. An LSH value of the file of the DLL is calculated. A plurality of centroids of a known normal DLL is retrieved from a repository, each centroid of the plurality of centroids is representative of a cluster of a plurality of clusters, each of the plurality of clusters comprising LSH values of files of a known version of the known normal DLL. A distance between the LSH value of the file of the DLL and each of the plurality of centroids is calculated. A smallest distance between the LSH value of the file of the DLL and each of the plurality of centroids is selected. The smallest distance is compared to a risk threshold. The loading of the DLL is detected as an anomaly in response to the smallest distance is not less than the risk threshold.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
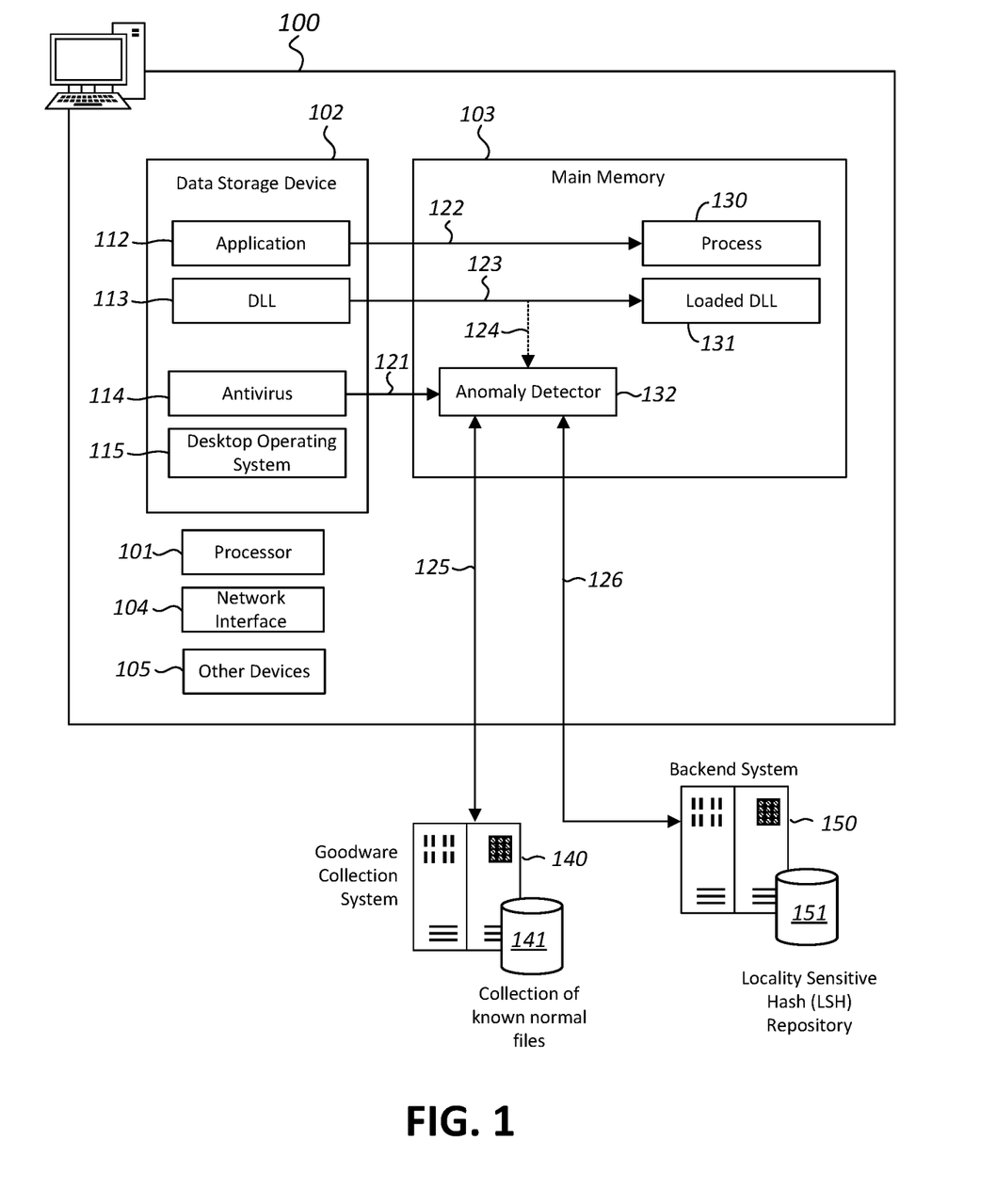
FIG. 1 shows a block diagram of a Windows-based desktop computer, in accordance with an embodiment of the present invention.

FIG. 1 shows a block diagram of a Windows-based desktop computer 100, in accordance with an embodiment of the present invention. The desktop computer 100 may be a laptop, personal computer, or other computer that runs a desktop operating system. The desktop computer 100 comprises at least one processor 101 (e.g., an INTEL processor; AMD processor), a data storage device 102 (e.g., spinning hard disk drive, solid state drive), a main memory 103 (e.g., Dynamic Random Access Memory (DRAM)), a computer network interface 104 (e.g., network interface card (NIC)), and other devices 105 (e.g., display screen, keyboard, graphics card, mouse). The at least one processor 101 may have a plurality of processing cores. Instructions of program code (i.e., software) are stored in the main memory 103 for execution by the at least one processor 101 to cause the desktop computer 100 to perform steps in accordance with the program code. In one embodiment, the desktop computer 100 belongs to an enterprise computer network. The enterprise computer network includes a plurality of desktop computers, but only one is shown for clarity of illustration.

The desktop computer 100 is Windows-based in that it runs a desktop operating system 115 that is the MICROSOFT WINDOWS operating system, which is currently a version 11. As can be appreciated, embodiments of the present invention are equally applicable to other versions of the MICROSOFT WINDOWS operating system, such as the version 10 and future compatible versions.

The data storage device 102 stores files of the desktop computer 100, which in the example of FIG. 1 includes files of an application program 112, a dynamic-link library (DLL) 113, antivirus program 114, and the desktop operating system 115. In the present disclosure, references to a locality sensitive hash (LSH) value or filename of a DLL are with respect to the file of the DLL. That is, an LSH value of a DLL and a filename of the DLL refers to the LSH value and the filename, respectively, of the file of the DLL. There are several DLLs and application programs on the desktop computer 100, but only one of each is shown for clarity of illustration.

The antivirus program 114 comprises one or more components for performing cybersecurity on the desktop computer 100. The antivirus program 114 may be configured to perform spam email detection, file scanning, and other conventional cybersecurity operations. In the example of FIG. 1, the antivirus program 114 further performs anomalous DLL loading detection as described herein. As its name indicates, anomalous DLL loading detection involves determining whether the loading of a DLL is an anomaly. The anomaly detection does not provide an indication of whether the loaded DLL is in fact malicious. However, detecting that the loading of the DLL is an anomaly advantageously allows a user of the desktop computer 100 or an administrator (e.g., security operations center (SOC) personnel, information technology (IT) personnel) of the enterprise computer network to be alerted. This allows the loading of the DLL to be further investigated for possible DLL side-loading.

An executable program can be started automatically (e.g., on startup of the desktop computer) or manually (e.g., by double clicking on an icon of the executable program). When the executable program is started, the desktop operating system creates a process of the executable program and loads the image of the process into the allocated memory space of the process. The executable program, more specifically its process, thereafter runs on the desktop computer.

In the example of FIG. 1, the application program 112 and the antivirus program 114 are executable programs. A process 130 is a process of the application program 112. An anomaly detector 132 is a process of the antivirus program 114 for detecting anomalous DLL loading.

In one embodiment, the antivirus program 114 works in conjunction with a goodware collection system 140 and a backend system 150 to detect an anomalous DLL loading. The desktop computer 100 may communicate with the goodware collection system 140 and the backend system 150 over the public Internet.

For purposes of the present disclosure, "known" refers to something that is known to cybersecurity experts or other trustworthy entity. For example, a known normal file is a file that has been verified or vetted by cybersecurity experts or other trustworthy entities to be safe/legitimate. Similarly, a known normal DLL is a DLL that has been verified or vetted by cybersecurity experts or other trustworthy entities to be safe/legitimate.

The goodware collection system 140 comprises a cloud computing platform or a dedicated server computer system that collects, from various sources, samples of known normal files that are maintained in a collection 141 of known normal files. The collection 141 may be stored on local storage, network attached storage, or cloud storage of the goodware collection system 140. A target (i.e., being evaluated) file may be provided to the goodware collection system 140, which compares the target file to known normal files in the collection 141 to determine if the target file is a known normal file. The goodware collection system 140 may be a conventional goodware collection system, such as the Normal File Collection (NFC)/Goodware Resource and Information Database (GRID) of Trend Micro Incorporated.

The backend system 150 comprises a computer system that hosts an LSH repository 151. The LSH repository 151 may be implemented on local storage, network attached storage, or cloud storage of the backend system 150. The backend system 150 may be implemented on a dedicated server computer system or a cloud computing platform (e.g., Amazon Web Services (AWS)™ platform), for example. The backend system 150 includes program code for performing the functions of the backend system 150 as described herein.

The LSH repository 151 comprises a collection of clustered LSH values of known versions of known normal DLLs. More particularly, each known normal DLL may have one or more known versions, and each version may have one or more associated files, each with its own LSH value in the repository 151. Accordingly, each known normal DLL may have several clusters of LSH values, with each cluster comprising LSH values of a particular version of the known normal DLL. Each cluster may have a centroid, which is an LSH value that is representative of the LSH values in the cluster.

Locality sensitive hashes are well known. Unlike other types of hashes, such as cryptographic hashes, small changes to a file will result in different but very similar LSH values. That is, with a suitable locality sensitive hashing algorithm, such as the TLSH algorithm, a file and small changes to the file will likely yield different but very similar LSH values. The mathematical distance ("distance") between LSH values of two files may be calculated to determine similarity of the two files. The smaller the distance, the more similar the LSH values and thus the files. LSH values may be deemed to be similar when they are within a threshold distance; the threshold distance may be adjusted based on false positive/false negative requirements.

In one embodiment, all LSH values described herein are calculated using the TLSH algorithm. Open source program code of the TLSH algorithm for calculating the TLSH value of a file is generally available on the Internet and other sources. Open source program code of the TLSH algorithm may also include a distance calculation function, which may be used to calculate similarity of two TLSH values.

In an example operation, the anomaly detector 132 is loaded to execute in the memory 103 when the antivirus program 114 is started (see arrow 121). Similarly, the process 130 is loaded to execute in the memory 103 when the application program 112 is started (see arrow 122). The process 130 thereafter loads the DLL 113 (see arrow 123). The DLL 113 as loaded in the memory 103 is also referred to herein as a loaded DLL 131. The application program 114 may be a trusted or signed program, and accordingly allowed by the desktop operating system 115 to execute. However, the DLL 113 is not necessarily normal. That is, the DLL 113 is potentially malicious and is side-loaded by the application program 114 to avoid detection.

The anomaly detector 132 detects the loading of the DLL 113 (see arrow 124). The anomaly detector 132 may detect the loading of a DLL a variety of conventional ways without detracting from the merits of the present invention. For example, the loading of the DLL 113 may be detected by hooking a suitable API, such as the LdrLoadDll function in the MICROSOFT WINDOWS operating system.

The anomaly detector 132 identifies the DLL 113 as having been loaded. The file of the DLL 113, including its file path and filename, may be identified from the hooked function, for example. The anomaly detector 132 consults the goodware collection system 140 to determine whether or not the file of the DLL 113 is a known normal file (see arrow 125). In one embodiment, the anomaly detector 132 provides the file or hash of the DLL 113 to the goodware collection system 140 over the public Internet. The goodware collection system 140 compares the file or hash of the DLL 113 to those of known DLLs to determine if the file of the DLL 113 is normal.

When the goodware collection system 140 does not indicate that the file of the DLL 113 is normal, the anomaly detector 132 consults the backend system 150 to determine whether the loading of the DLL 113 is anomalous (see arrow 126). In one embodiment, the anomaly detector 132 calculates the LSH value of the DLL 113, and provides the LSH value and filename of the DLL 113 to the backend system 150 over the public Internet. The backend system 150 uses the LSH value of the DLL 113 to determine whether the loading of the DLL 113 is an anomaly. The anomaly detector 132, other component of the antivirus program 114, or the backend system 150 may perform a response action in response to detecting an anomalous DLL loading. The response action may include raising an alert, such as sending a notification to a user or administrator. The notification may be displayed as a message on a display screen, sent by email or text message, etc.

The following is an example algorithm that may be employed to implement the anomaly detector 132 working in conjunction with the backend system 150.
 (1) Hook the DLL loading function within a process
 (2) Get DLL information from the parameters of the DLL loading function (filename, path)
 (3) Compute the hash value of the loaded DLL
 (4) Connect to Goodware Collection System
   (a) Send the computed hash value of the loaded DLL to check if known DLL to the Goodware Collection System
 (5) Calculate LSH value of the loaded DLL if not a known DLL file
 (6) Check for anomaly
   (a) Query filename if exist within LSH repository
     (a.1) Pass if filename does not exist
   (b) Calculate the distances of the loaded DLL from the centroids of the LSH Forests
   (c) Get the smallest value from the distances
   (d) Compare the smallest value with the normal distance threshold
     (d.1) Return normal if below the normal distance threshold
   (e) Compare the smallest value with the low risk threshold
     (e.1) Return low risk if below the low risk threshold
   (f) Compare the value with the medium risk threshold
     (f.1) Return medium risk if below the medium risk threshold
   (g) Return high risk In one embodiment, for continuous detection improvement, the anomaly detector 132 sends the backend system 150 feedback data regarding anomalies or security events detected on the desktop computer 100.

Figure 2:
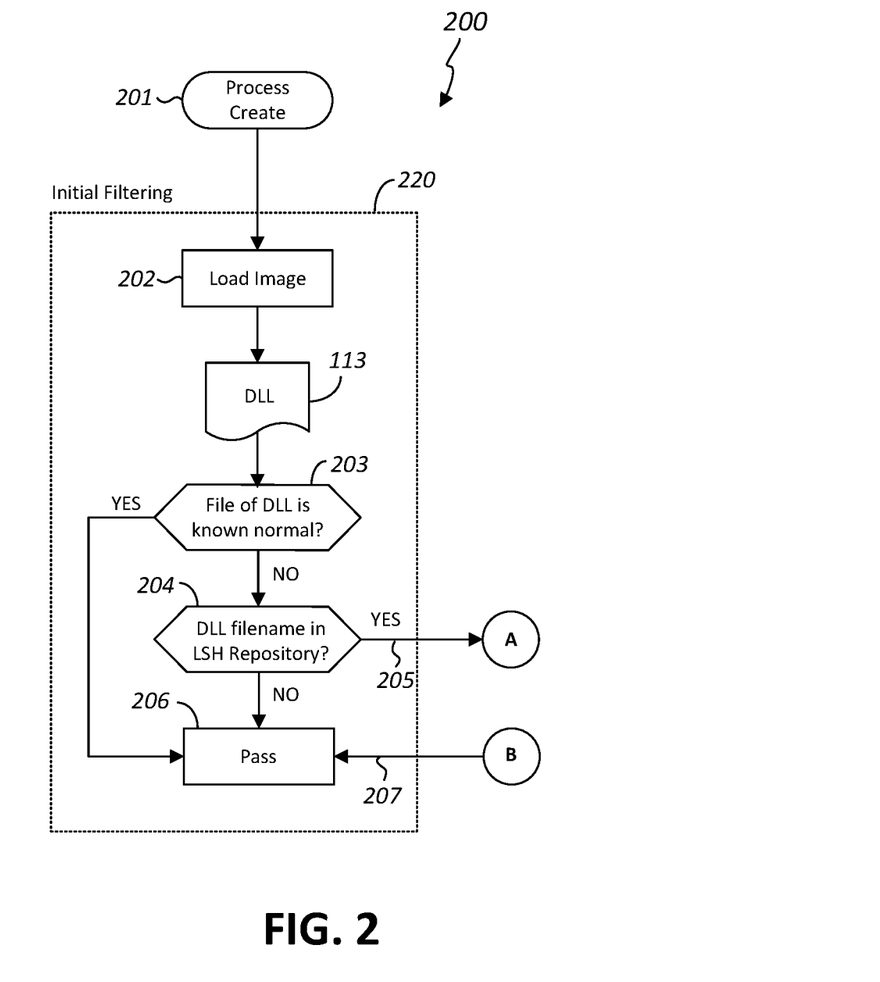
FIGS. 2-4 show a flow diagram of a method of detecting an anomalous loading of a DLL, in accordance with an embodiment of the present invention.
Figure 3:
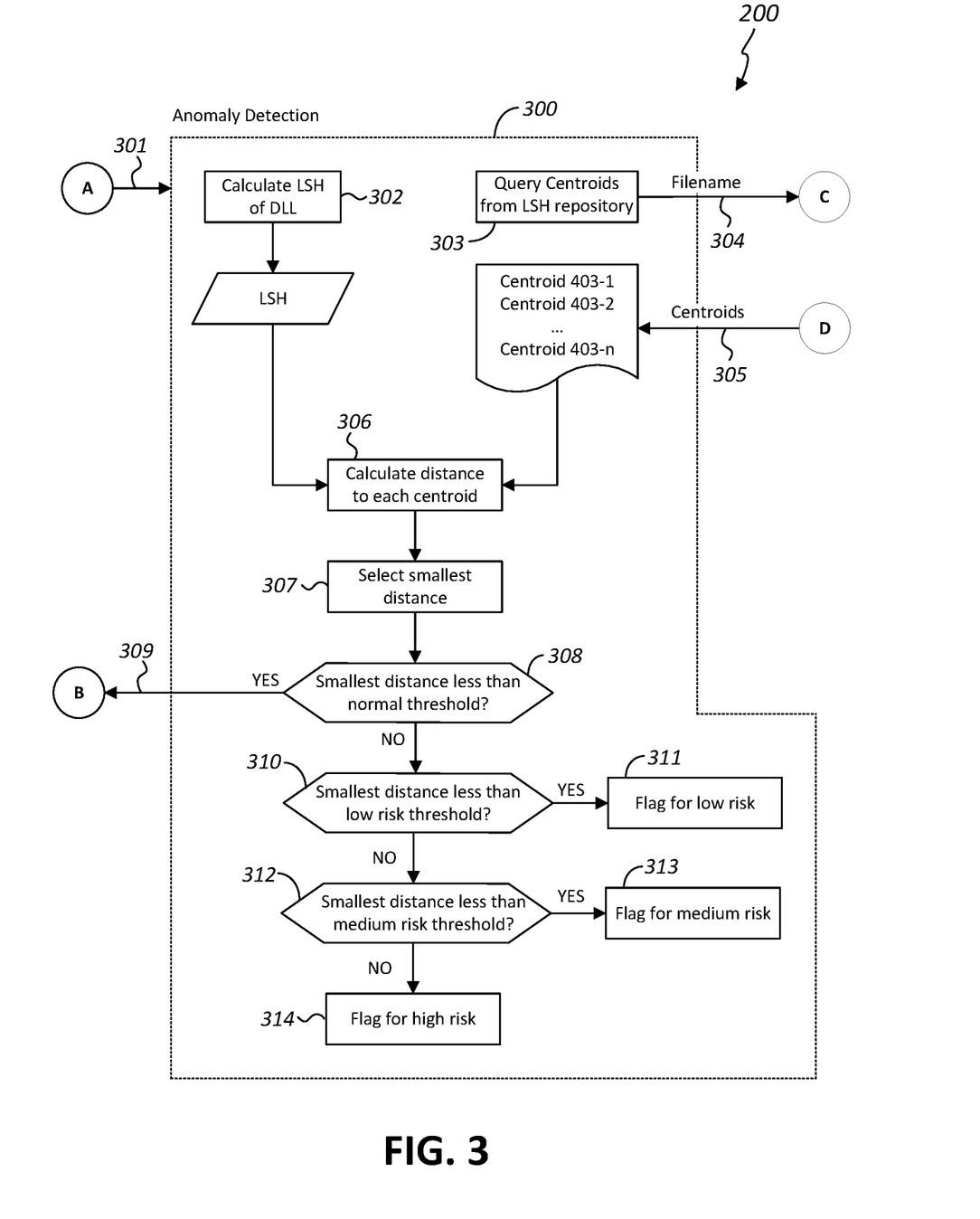
Figure 4:
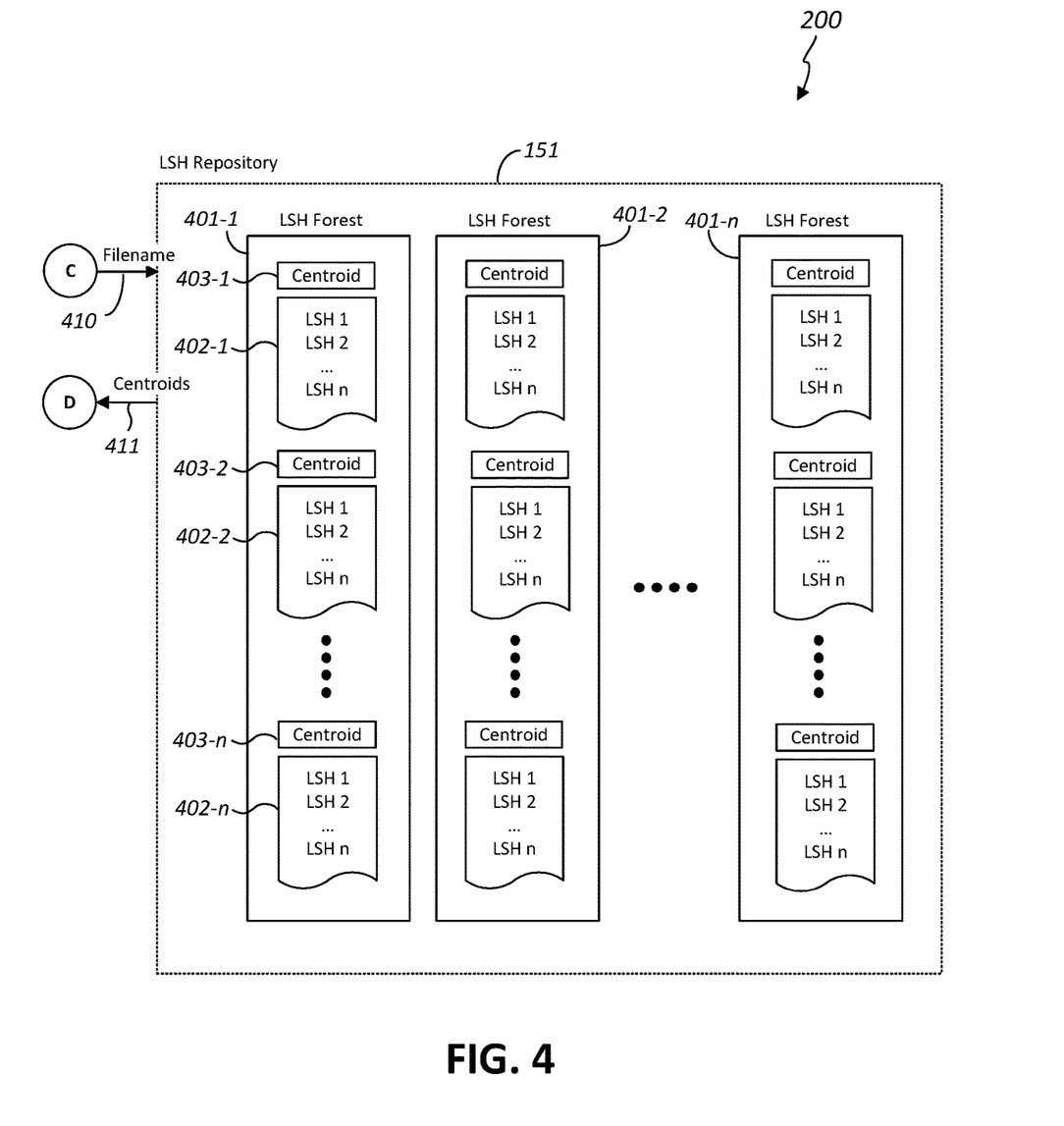

FIGS. 2-4 show a flow diagram of a method 200 of detecting anomalous loading of a DLL, in accordance with an embodiment of the present invention. The method 200 is explained with certain functionalities performed by the desktop computer 100 and other functionalities performed by the backend system 150 for illustration purposes only. As can appreciated, other components may also be employed, and functionalities may be distributed among different components.

The method 200 includes an initial filtering stage (FIG. 2, 220) that includes detecting the loading of a DLL and determining whether the file of the DLL is a known normal file. The method 200 further includes an anomaly detection stage (FIG. 3, 300), which detects whether the loading of a DLL is an anomaly.

Referring to FIG. 2, the method 200 begins when the application program 112 is started on the desktop computer 100, causing the desktop operating system 115 to create the process 130 of the application program 112 (step 201). The desktop operating system 115 loads the image of the process 130 in the memory 103 to start execution of the process 130 (step 202). The process 130 loads the DLL 113, which is detected by the anomaly detector 132. The anomaly detector 132 consults the goodware collection system 140 to determine if the file of the DLL 113 is a known normal file (step 203). When the file of the DLL 113 is a known normal file, the anomaly detector 132 allows the DLL 113 to pass (step 203 to step 206), i.e., does not perform any other action on the DLL 113.

Otherwise, when the file of the DLL 113 is not a known normal file, the anomaly detector 132 determines, prior to the anomaly detection stage, if the LSH repository 151 has a known normal DLL that corresponds to the DLL 113. In one embodiment, the correspondence is determined by filename. More particularly, the anomaly detector 132 determines if the LSH repository 151 includes a known normal DLL with a same filename as the DLL 113 (step 204). For example, the anomaly detector 132 may provide the filename of DLL 113 to the backend system 150, which determines whether the LSH repository 151 has an entry for the filename. Alternatively, a listing of filenames of known normal DLLs in the LSH repository 151 may be maintained locally on the desktop computer 100 to facilitate access by the anomaly detector 132. This allows the anomaly detector 132 to determine if the LSH repository 151 includes the filename of the DLL 113 before expending network bandwidth to communicate with the backend system 150.

When the LSH repository 151 has an entry for a known normal DLL with the same filename as the DLL 113, the method 200 continues to the anomaly detection stage (see arrow 205) to determine if the loading of the DLL 113 is an anomaly. Otherwise, if the LSH repository 151 does not have an entry for a known normal DLL with the same filename as the DLL 113, the anomaly detector 132 simply allows the DLL 113 to pass (step 204 to step 206).

Referring to FIG. 3, the method 200 continues to the anomaly detection stage when the LSH repository 151 has an entry for a known normal DLL with the same filename as the DLL 113 (see arrow 301). The LSH value of the DLL 113 is calculated as part of the anomaly detection stage (step 302). The calculation of the LSH value of the DLL 113 may be performed by the anomaly detector 132 on the desktop computer 100 and provided to the backend system 150. Alternatively, the anomaly detector 132 may provide the file of the DLL 113 to the backend system 150, which then calculates the LSH value of the file. In one embodiment, all LSH values described herein are calculated using the TLSH algorithm. That is, the LSH values of the embodiments are TLSH values.

In the anomaly detection stage, the backend system 150 receives the filename of the DLL 113 from the anomaly detector 132. The backend system 150 queries the LSH repository 151 for centroids of a known normal DLL that has the same filename as the DLL 113 (step 303). The LSH repository 151 is now further explained with reference to FIG. 4.

Referring to FIG. 4, the LHS repository 151 comprises a plurality of LSH forests 401 (i.e., 401-1, 401-2, . . . , 401-n). Each LSH forest 401 comprises a plurality of clusters 402 (i.e., 402-1, 402-2, . . . , 402-n), with each cluster 402 having a centroid 403 (i.e., 403-1, 403-2, . . . , 403-n).

Each LSH forest 401 is for a particular known normal DLL, which in one embodiment is identified by its filename. Each cluster 402 is for a particular version of the known normal DLL. LSH values of a version of a known normal DLL are clustered together in a same cluster 402. Each cluster 402 has a centroid 403. A centroid 403, which is also an LSH value, is representative of the LSH values of the corresponding cluster 402. A centroid 403 may be described as an average, median, or some other relationship between the members (i.e., LSH values) of the cluster 402, depending on the clustering algorithm employed.

As a particular example, the LSH forest 401-1 may be for a DLL having a filename "sample.dll". The "sample.dll" has different known versions 1, 2, etc., with each version having been found to have different files. The clusters 402-1, 402-2, 402-n are a result of applying a clustering algorithm on the LSH values of the different versions of "sample.dll". The centroids 403-1, 403-2, 403-n are the representative of their corresponding clusters resulting from the application of the clustering algorithm on the LSH values.

Given a target filename (see arrow 410), the LSH repository 151 may be queried for all centroids 403 of an LSH forest 401 of a known normal DLL whose filename is the same as the target filename (see arrow 411). For example, assuming the LSH forest 401-1 is for a known normal DLL with the same filename as the DLL 113, the centroids 403-1, 403-2, . . . , 403-n of the LSH forest 401-1 are returned as a response to a query that has the filename of the DLL 113 as input.

Referring back to FIG. 3, in response to the query with the filename of the DLL 113 as input (see arrow 304), the backend system 150 receives all centroids 403 of an LSH forest 401 of a known normal DLL that has the same filename as the DLL 113 (see arrow 305). The backend system 150 calculates the distance between the LSH value of the DLL 113 and each of the centroids 403 retrieved from the LSH repository 151 (step 306) and selects the smallest distance (step 307). That is, the backend system 150 calculates the distance between the LSH value of the DLL 113 and a centroid 403-1, the distance between the LSH value of the DLL 113 and a centroid 403-2, etc. returned by the LSH repository 151, and selects the smallest calculated distance.

In one embodiment, different risk thresholds are predetermined for different risk levels, which in one embodiment are normal, low risk, medium risk, and high risk. The medium risk threshold is greater than the low risk threshold, which is greater than the normal threshold. Each risk level indicates a degree of security risk posed by an anomalous DLL loading. In one embodiment, a loading that poses a low risk, medium risk, or high risk is deemed to be an anomaly.

The backend system 150 compares the smallest distance to the normal threshold (step 308). When the smallest distance is less than the normal threshold, the backend system 150 deems the loading of the DLL 113 to be normal and so notifies the anomaly detector 132 (see arrow 309), which allows the DLL 113 to pass (see FIG. 2, arrow 207). Otherwise, when the smallest distance is not less than the normal threshold, the backend system 150 compares the smallest distance to the low risk threshold (step 308 to step 310).

When the smallest distance is less than the low risk threshold, the backend system 150 flags the loading of the DLL 113 as a low risk anomaly (step 311). Otherwise, when the smallest distance is not less than the low risk threshold, the backend system 150 compares the smallest distance to the medium risk threshold (step 310 to step 312).

When the smallest distance is less than the medium risk threshold, the backend system 150 flags the loading of the DLL 113 as a medium risk anomaly (step 313). Otherwise, when the smallest distance is not less than the medium risk threshold, the backend system flags the loading of the DLL 113 as a high risk anomaly (step 314).

The loading of the DLL 113 is an anomaly when the smallest distance is not less than the normal threshold. The risk level indicates the degree of the anomaly to allow for prioritization or other purpose. The backend system 150 informs the anomaly detector 132 of the result of the evaluation of the loading of the DLL 113, for example as a return value of an API of the backend system 150.

Figure 5:
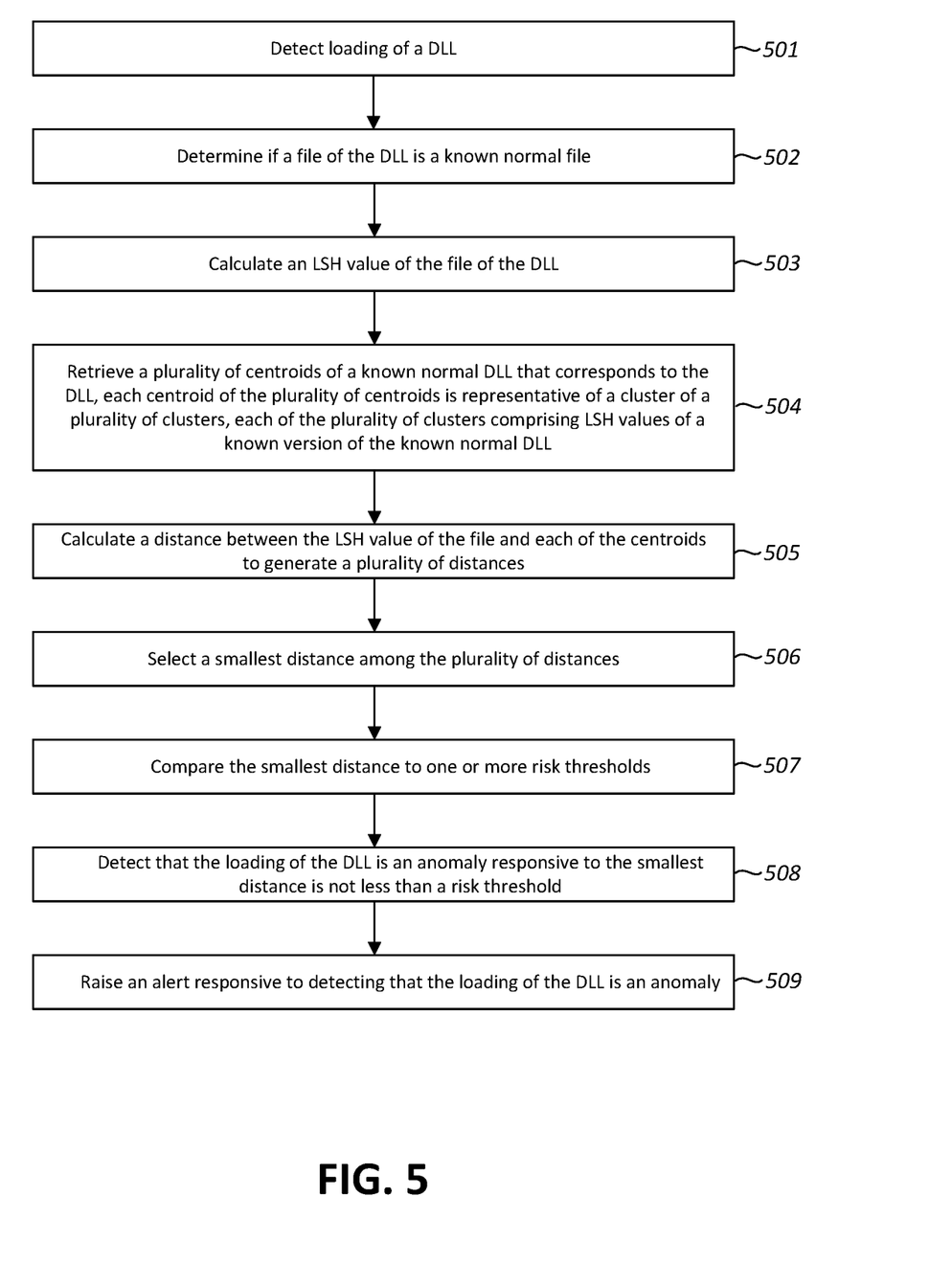
FIG. 5 shows a flow diagram of a method of detecting an anomalous loading of a DLL, in accordance with an embodiment of the present invention.

FIG. 5 shows a flow diagram of a method of detecting an anomalous loading of a DLL, in accordance with an embodiment of the present invention. The method of FIG. 5 may be performed using previously-discussed components. As can be appreciated, other components may also be employed without detracting from the merits of the present invention.

In step 501, the loading of a DLL by a process of an application program is detected.

In step 502, it is determined if a file of the DLL is a known normal file.

In step 503, when the file of the DLL is not a known normal file, the LSH value of the file of the DLL is calculated. In one embodiment, the LSH value of the file of the DLL is calculated using the TLSH algorithm. As can be appreciated, the LSH value of the file of the DLL may be calculated before or after determining whether the file of the DLL is a known normal file. Generally, the LSH value of the file of the DLL may be calculated before the distance calculation of step 505.

In step 504, a plurality of centroids of a known normal DLL that corresponds to the DLL are retrieved from an LSH repository. In one embodiment, the correspondence between the known normal DLL and the DLL is by filename, i.e., the known normal DLL has a file with the same filename as the file of the DLL. Each centroid of the plurality of centroids is representative of a cluster of a plurality of clusters, with each of the plurality clusters comprising LSH values of files of a known version of the known normal DLL. In one embodiment, LSH values in the LSH repository, including the plurality of centroids, are TLSH values.

In step 505, a distance between the LSH value of the file of the DLL and each of the centroids is calculated. This results in a plurality of distances, with each distance being between the LSH value of the file of the DLL and a centroid of the plurality of centroids.

In step 506, a smallest distance among the plurality of distances is selected.

In step 507, the smallest distance is compared to one or more risk thresholds.

In step 508, the loading of the DLL is detected to be an anomaly responsive to the smallest distance is not less than a risk threshold.

In step 509, an alert is raised responsive to detecting that the loading of the DLL is an anomaly.

Figure 6:
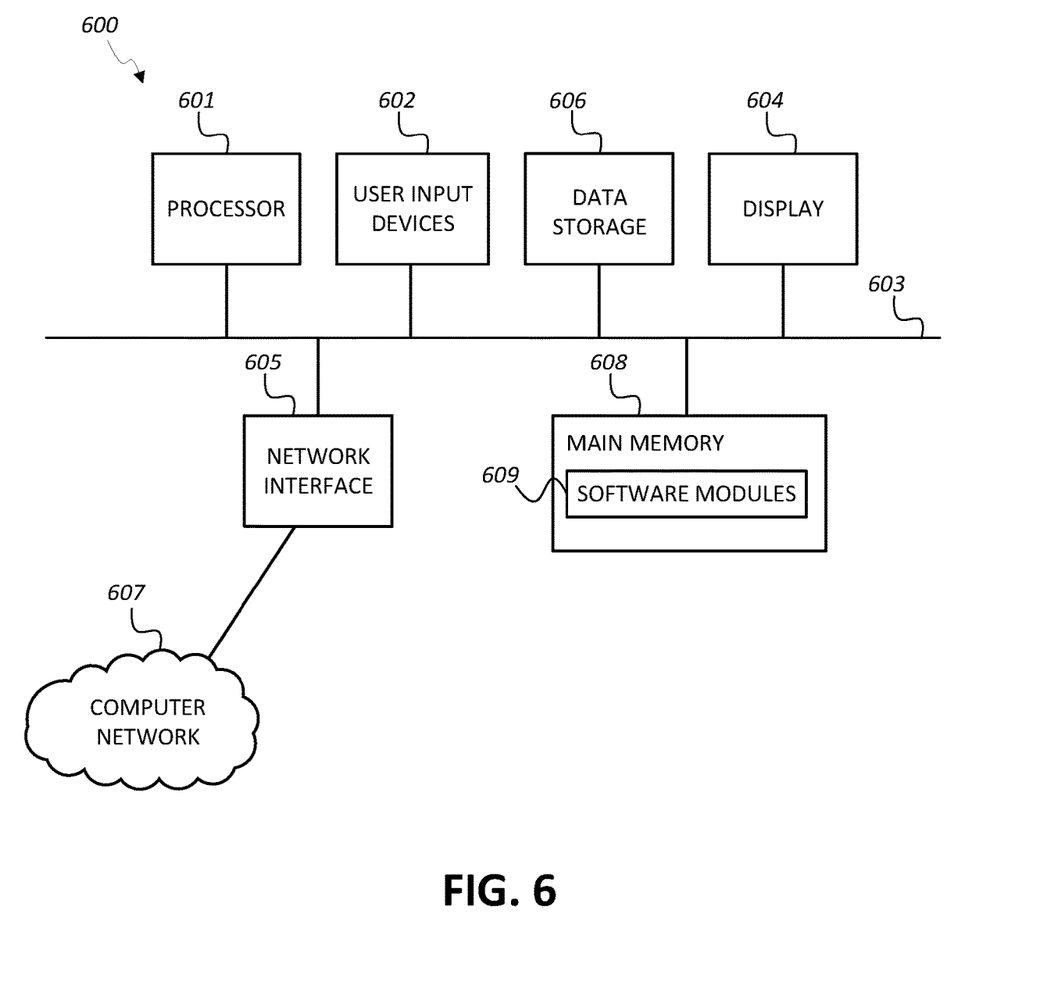
FIG. 6 shows a block diagram of a computer system that may be employed with embodiments of the present invention.

FIG. 6 shows a block diagram of a computer system 600 that may be employed with embodiments of the present invention. The computer system 600 may be employed as a desktop computer, a goodware collection system, backend system, or other computer for performing functionality described herein. The computer system 600 may have fewer or more components to meet the needs of a particular cybersecurity application. The computer system 600 may include at least one processor 601. The computer system 600 may have one or more buses 603 coupling its various components. The computer system 600 may include one or more user input devices 602 (e.g., keyboard, mouse), one or more data storage devices 606, a display screen 604, a computer network interface 605, and a main memory 608. The computer network interface 605 may be coupled to a computer network 607, which in this example includes the public Internet.

The computer system 600 is a particular machine as programmed with one or more software modules 609, comprising instructions of program code stored non-transitory in the main memory 608 for execution by at least one processor 601 to cause the computer system 600 to perform corresponding programmed steps. An article of manufacture may be embodied as computer-readable storage medium including instructions that when executed by at least one processor 601 cause the computer system 600 to be operable to perform the functions of the one or more software modules 609.

While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of detecting an anomalous loading of a dynamic-link library (DLL), the method comprising:

detecting loading of a DLL by an application program on a desktop computer;

determining if a file of the DLL is a known normal file;

in response to the file of the DLL is not a known normal file, calculating a locality sensitive hash (LSH) value of the file of the DLL;

retrieving a plurality of centroids of a known normal DLL that corresponds to the DLL, each centroid of the plurality of centroids is representative of a cluster of a plurality of clusters, each of the plurality of clusters comprising LSH values of files of a known version of the known normal DLL;

calculating a distance between the LSH value of the file of the DLL and each of the plurality of centroids to generate a plurality of distances;

selecting a smallest distance among the plurality of distances;

comparing the smallest distance to a first risk threshold; and detecting that the loading of the DLL is an anomaly in response to the smallest distance is not less than the first risk threshold.

2. The method of claim 1, further comprising:

raising an alert in response to detecting that the loading of the DLL is an anomaly.

3. The method of claim 2, wherein raising the alert includes sending a notification to a user of the desktop computer or an administrator of an enterprise computer network that includes the desktop computer.

4. The method of claim 1, further comprising:

comparing the smallest distance to a second risk threshold that is greater than the first risk threshold; and raising an alert that the loading of the DLL is a low risk anomaly in response to the smallest distance is not less than the first risk threshold but is less than the second risk threshold.

5. The method of claim 1, further comprising:

comparing the smallest distance to a second risk threshold that is greater than the first risk threshold;

in response to the smallest distance is not less than the second risk threshold, comparing the smallest distance to a third risk threshold that is greater than the second risk threshold; and raising an alert that the loading of the DLL is a medium risk anomaly in response to the smallest distance is less than the third risk threshold.

6. The method of claim 1, further comprising:

comparing the smallest distance to a second risk threshold that is greater than the first risk threshold;

in response to the smallest distance is not less than the second risk threshold, comparing the smallest distance to a third risk threshold that is greater than the second risk threshold; and raising an alert that the loading of the DLL is a high risk anomaly in response to the smallest distance is not less than the third risk threshold.

7. The method of claim 1, wherein each of the plurality of centroids and the LSH value of the file of the DLL is a TLSH value.

8. A system for detecting anomalous loading of a dynamic-link library (DLL) on a desktop computer, the system comprising:

a desktop computer comprising at least one processor and a memory, the memory of the desktop computer storing instructions that when executed by the at least one processor of the desktop computer cause the desktop computer to:

detect loading of a DLL by an application program;
determine if a file of the DLL is a known normal file;
calculate a locality sensitive hash (LSH) value of the file of the DLL; and
in response to the file of the DLL is not a known normal file, provide the LSH value and a filename of the file of the DLL to a backend system; and the backend system comprising at least one processor and a memory, the memory of the backend system storing instructions that when executed by the at least one processor of the backend system cause the backend system to:
retrieve a plurality of centroids of a known normal DLL having a file that has a same filename as the file of the DLL, each centroid of the plurality of centroids is representative of a cluster of a plurality of clusters, each of the plurality of clusters comprising LSH values of files of a known version of the known normal DLL;
calculate a distance between the LSH value of the file of the DLL and each of the plurality of centroids to generate a plurality of distances;
select a smallest distance among the plurality of distances;
compare the smallest distance to a risk threshold, and
detect that the loading of the DLL is an anomaly in response to the smallest distance is not less than the risk threshold.

9. The system of claim 8, wherein the instructions stored in the memory of the backend system, when executed by the at least one processor of the backend system, cause the backend system to raise an alert in response to detecting that the loading of the DLL is an anomaly.

10. The system of claim 8, wherein the instructions stored in the memory of the backend system, when executed by the at least one processor of the backend system, cause the backend system to raise an alert by sending a notification to a user of the desktop computer or an administrator of an enterprise computer network that includes the desktop computer.

11. The system of claim 8, wherein each of the plurality of centroids and the LSH value of the file of the DLL is a TLSH value.

12. The system of claim 8, further comprising a goodware collection system that determines whether the file of the DLL is a known normal file.

13. A method of detecting an anomalous loading of a dynamic-link library (DLL), the method comprising:
detecting loading of a DLL by an application program on a desktop computer;
calculating a locality sensitive hash (LSH) value of the file of the DLL;
receiving a plurality of centroids of a known normal DLL, each centroid of the plurality of centroids is representative of a cluster of a plurality of clusters, each of the plurality of clusters comprising LSH values of files of a known version of the known normal DLL;
generating a plurality of distances by calculating a distance between the LSH value of the file of the DLL and each of the plurality of centroids;
selecting a smallest distance among the plurality of distances;
comparing the smallest distance to a risk threshold; and
detecting that the loading of the DLL is an anomaly in response to the smallest distance is not less than the risk threshold.

14. The method of claim 13, further comprising:
raising an alert in response to detecting that the loading of the DLL is an anomaly.

15. The method of claim 14, wherein raising the alert includes sending a notification to a user of the desktop computer or an administrator of an enterprise computer network that includes the desktop computer.

16. The method of claim 13, wherein each of the plurality of centroids and the LSH value of the file of the DLL is a TLSH value.

* * * * *